United States Patent
Uy et al.

(10) Patent No.: US 11,438,759 B2
(45) Date of Patent: Sep. 6, 2022

(54) MOBILE PROFILE DOWNLOAD VIA NULL-AUTHENTICATED COMMUNICATIONS SESSION

(71) Applicant: VERIZON PATENT AND LICENSING INC., Basking Ridge, NJ (US)

(72) Inventors: Warren Hojilla Uy, Randolph, NJ (US); Mun Wei Low, Irving, TX (US); Manuel Enrique Caceres, Basking Ridge, NJ (US); Hitesh A. Anklesaria, Monroe, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/109,532

(22) Filed: Dec. 2, 2020

(65) Prior Publication Data

US 2022/0174474 A1 Jun. 2, 2022

(51) Int. Cl.
*H04W 8/20* (2009.01)
*H04W 76/50* (2018.01)
*H04W 60/04* (2009.01)
*H04W 12/062* (2021.01)

(52) U.S. Cl.
CPC .......... *H04W 8/20* (2013.01); *H04W 12/062* (2021.01); *H04W 60/04* (2013.01); *H04W 76/50* (2018.02)

(58) Field of Classification Search
CPC ..... H04W 8/20; H04W 76/50; H04W 12/062; H04W 60/04
USPC ......................................................... 455/411
See application file for complete search history.

(56) References Cited

U.S. PATENT DOCUMENTS

| | | | |
|---|---|---|---|
| 10,455,536 B1 * | 10/2019 | Khawand | H04W 8/183 |
| 2013/0035063 A1 * | 2/2013 | Fisk | H04M 1/72463 455/410 |
| 2015/0358807 A1 * | 12/2015 | Gorey | H04W 48/18 455/432.1 |
| 2017/0048251 A1 * | 2/2017 | Guday | H04W 12/04 |
| 2017/0367031 A1 * | 12/2017 | Kuge | H04L 63/0876 |
| 2020/0169881 A1 * | 5/2020 | Linton | H04W 12/08 |
| 2020/0267625 A1 * | 8/2020 | Deshmukh | H04W 8/186 |
| 2020/0396793 A1 * | 12/2020 | Tiwari | H04W 60/02 |

* cited by examiner

*Primary Examiner* — Joel Ajayi

(57) ABSTRACT

An improved cellular network architecture enables the provisioning of mobile profiles on devices lacking bootstrap profiles. A mobile device transmits an attach request that includes a pre-configured mobile country code (MCC) and mobile network code (MNC) uniquely associated with an emergency data session. The mobile device is then null-authenticated with a subscriber database, and an emergency data session is established, the emergency data session allowing traffic to a mobile profile manager. The mobile device can then download a mobile profile from the mobile profile using the emergency data session. Thus, a mobile device does not require a provisioning profile to download a full (or provisioning) mobile profile from a cellular network as in existing solutions.

20 Claims, 7 Drawing Sheets

MOBILE PROFILE DOWNLOAD VIA NULL-AUTHENTICATED COMMUNICATIONS SESSION

BACKGROUND INFORMATION

A device must first authenticate to a network before utilizing the network for voice or data services. A user's credentials used in this authentication are generally stored in a profile such as a subscriber identity module (SIM) or universal integrated circuit card (UICC). In general, a SIM/UICC is an integrated circuit device that stores mobile subscriber credentials and other data for authenticating to a mobile network.

Authentication requires a bootstrap (or provisioning) profile to initiate the download of an active profile. If no bootstrap profile is found, a non-cellular data connection must be used to retrieve an active profile. However, no technical solutions currently exist to allow for the retrieval of mobile profiles over a cellular network without using a bootstrap profile.

DETAILED DESCRIPTION OF EXAMPLE EMBODIMENTS

Figure 1:
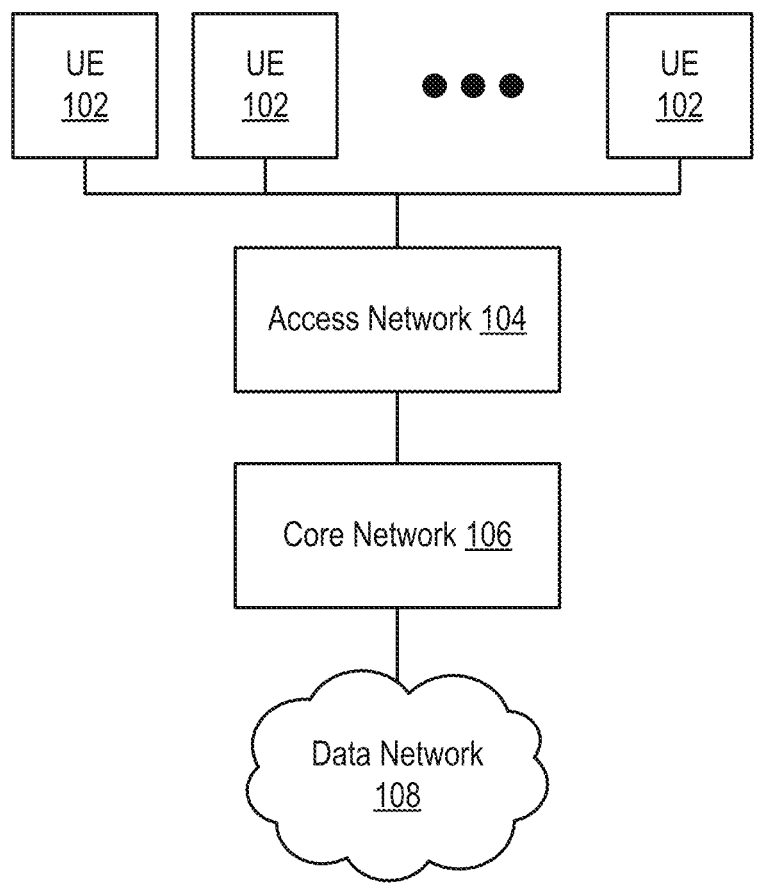
FIG. 1 is a block diagram of a cellular network according to some embodiments of the disclosure.

To solve the aforementioned problems, the disclosed embodiments utilize an emergency attach procedure to initiate a communication session when a bootstrap profile is not present in user equipment (UE) and the UE is otherwise not able to access a data network such as the Internet. In this scenario, the emergency attach procedure is used to connect to the data network. The core network then null-authenticates the UE and provides an alternative and limited-access data path to allow the UE to retrieve a mobile profile.

In some embodiments, a method is disclosed that comprises receiving, from a UE, an attach request, the attach request including a pre-configured mobile country code (MCC) and mobile network code (MNC) to establish a data session through a mobile network; null-authenticating the UE with a subscriber database using the MCC and MNC; establishing an emergency data session between the UE and a network device, the emergency data session allowing traffic to a mobile profile manager; and transmitting, to the UE, a mobile profile from the mobile profile manager using the emergency data session.

In one embodiment, the subscriber database is configured to detect the MCC and MNC and authenticate the UE without accessing a subscriber identifier. In one embodiment, the method further comprises disallowing traffic to external network devices other than the mobile profile manager based on the emergency data session, an external network device comprising a network device external to the gateway device and communicatively connected to a public data network. In one embodiment, receiving the emergency attach request comprises receiving the emergency attach request from a small cell access point. In one embodiment, the method further comprises deleting the emergency data session in response to a successful download of the mobile profile.

In other embodiments, a non-transitory computer-readable storage medium for storing instructions capable of being executed by a processor is disclosed. In these embodiments, the instructions defining the steps of: receiving, from a UE, an attach request, the attach request including a pre-configured MCC and MNC to establish a data session through a mobile network; null-authenticating the mobile device with a subscriber database using the MCC and MNC; establishing an emergency data session between the UE and a gateway device, the emergency data session allowing the UE to communicate with a mobile profile manager; and transmitting a mobile profile from the mobile profile manager to the UE using the emergency data session.

In one embodiment, receiving the attach request comprises receiving the attach request from a small cell access point. In one embodiment, the null-authenticating comprising transmitting a null subscriber identifier with the MCC and MNC, the null scriber identifier, MCC, and MNC combined as an International Mobile Subscriber Identity (IMSI) of an authentication request. In one embodiment, the instructions further define the step of deleting the emergency data session in response to a successful download of the mobile profile. In one embodiment, deleting the emergency data session further comprises issuing a detach request to the UE.

In other embodiments, a device is disclosed comprising a processor configured to: detect that a mobile profile is not stored by the device; identify a pre-configured MCC and MNC to establish a data session; transmit an attachment request to a mobile network, the attachment request including the MCC and MNC, null authenticate with the mobile network; establish a data session through the mobile network after successfully authenticating with the mobile network; and download an active mobile profile from a profile manager after establishing the data session.

In one embodiment, detecting that the mobile profile is not stored by the device is triggered after the device powers on. In one embodiment, detecting that a mobile profile is not stored by the device comprises determining, by the processor, that a provisioning profile is not stored in a programmable device of the device. In one embodiment, the programmable device comprises a device selected from at least one of an embedded-SIM (eSIM), an embedded universal integrated circuit card (eUICC), a Smart Secure Platform (SSP), or an integrated UICC (iUICC). In one embodiment, detecting that a mobile profile is not stored by the device comprises determining that a SIM or UICC is not communicatively coupled to the device. In one embodiment, detecting that a mobile profile is not stored by the device comprises determining that a provisioning profile is not stored in a programmable device of the device.

In one embodiment, transmitting the attachment request to a mobile network comprises transmitting the attachment request to a small cell access point. In one embodiment, transmitting the attachment request to a mobile network comprises transmitting the attachment request to a private mobile network. In one embodiment, establishing the data session comprises establishing a bearer path with a packet gateway, wherein the packet gateway is configured to allow data traffic to a mobile profile manager. In one embodiment, the processor is further configured to write the active mobile profile to a programmable device of the device and disable a null authentication capability after writing the active mobile profile.

FIG. 1 is a block diagram of a cellular network according to some embodiments of the disclosure.

In the illustrated embodiment, UE (102) accesses a data network (108) via an access network (104) and a core network (106). In the illustrated embodiment, UE (102) comprises any computing device capable of communicating with the access network (104). As examples, UE (102) may include mobile phones, tablets, laptops, sensors, Internet of Things (IoT) devices, and any other devices equipped with a cellular transceiver. One example of a UE is provided in FIG. 6.

In the illustrated embodiment, the access network (104) comprises a network allowing over-the-air network communication with UE (102). In general, the access network (104) includes at least one base station that is communicatively coupled to the core network (106) and wirelessly coupled to zero or more UE (102).

In one embodiment, the access network (104) comprises a fourth-generation (4G) cellular access network. In some embodiments, the access network (104) comprises a long-term evolution (LTE) access network. In one embodiment, the access network (104) and UE (102) comprise an Evolved Universal Mobile Telecommunications System (UMTS) Terrestrial Radio Access Network (E-UTRAN). In an embodiment, the access network (104) includes a plurality of Evolved Node B (eNodeB) base stations connected to UE (102) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (102). The eNodeB may additionally include multiple network interfaces for communicating with the core network (106). In one embodiment, the eNodeB includes an interface to communicate with a mobility manager (e.g., a Mobility Management Entity, MME) and a second interface to communicate with one or more gateway elements in the core network (106) such as a Serving Gateway (S-GW) or Packet Data Network Gateway (P-GW). In one embodiment, the mobility manager manages control plane traffic while the gateway elements manage user data traffic, as will be discussed. In some embodiments, base stations in the access network (104) are communicatively connected. For example, in a 4G network, individual eNodeB devices can be communicatively coupled, for example via an X2 interface or any other interface.

In one embodiment, the access network (104) comprises a fifth-generation (5G) cellular access network. In one embodiment, the access network (104) and UE (102) comprise a NextGen Radio Access Network (NG-RAN). In an embodiment, the access network (104) includes a plurality of next Generation Node B (gNodeB) base stations connected to UE (102) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (102). The gNodeB may additionally include multiple network interfaces for communicating with the core network (106). In one embodiment, the gNodeB includes an interface to communicate with a mobility manager (e.g., an Access and Mobility Management Function, AMF) and a second interface to communicate with one or more gateway elements in the core network (106) such as a Session Management Function (SMF) for control data or a User Plane Function (UPF) for user data. In one embodiment, the mobility manager manages control plane traffic while the gateway elements manage user data traffic, as will be discussed. In some embodiments, base stations in the access network (104) are communicatively connected. For example, in a 5G network, individual gNodeB devices can be communicatively coupled via an X2 interface.

In the illustrated embodiment, the access network (104) provides access to a core network (106) to the UE (102). In the illustrated embodiment, the core network may be owned and/or operated by a mobile network operator (MNO) and provides wireless connectivity to UE (102). In the illustrated embodiment, this connectivity may comprise voice and data services. The core network (106) includes various computing devices, which are described briefly herein. Further detail of such devices is provided in FIGS. 2A and 2B.

At a high-level, the core network (106) may include a user plane and a control plane. In one embodiment, the control plane comprises network elements and communications interfaces to allow for the management of user connections and sessions. By contrast, the user plane may comprise network elements and communications interfaces to transmit user data from UE (102) to elements of the core network (106) and to external network-attached elements in a data network (108) such as the Internet. An example of a control plane function comprises authenticating that a user is able to access the core network (106) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (106) may include a mobility manager, one or more gateways (e.g., a serving gateway and packet gateway), and a subscriber database. In practice, the core network (106) may include more components than these. In a 4G network, the mobility manager may be implemented by an MME, the serving gateway by an S-GW, the packet gateway by a P-GW, and the subscriber database by a home subscriber server (HSS). In a 5G network, the mobility manager may be implemented by an AMF, SMF, and an Authentication Server Function (AUSF). Specifically, the AMF performs mobility management while the SMF performs session management, both of which are described herein. Further, the AUSF obtains authentication vectors from a subscriber database. In a 4G network, the MME performs all of these functions. The serving gateway in a 5G network may be implemented by the SMF as well. Specifically, packet routing from the base station to the packet gateway may be handled by the SMF in contrast to the S-GW in a 4G network. In a 5G network, the packet gateway may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by Unified Data Management (UDM), which is part of the subscriber database, as described herein.

In brief, a UE (102) communicates with the mobility manager to authenticate and establish a session or bearer with the serving and packet gateways. The mobility manager accesses the subscriber data to confirm the UE (102) identity and communicates with the serving gateway to establish the session. Once established, the UE (102) transmits data requests through the session to the packet gateway, which manages the transmitting and receiving data to and from external network services. Specific details of these elements are provided in the following figures.

In the illustrated embodiment, the access network (104) and the core network (106) are operated by an MNO. However, in some embodiments, the networks (104, 106) may be operated by a private entity and may be closed to public traffic. For example, the components of the network (106) may be provided as a single device, and the access network (104) may comprise a small form-factor base station. In these embodiments, the operator of the device can simulate a cellular network, and UE (102) can connect to this network similar to connecting to a national or regional network. Further details on this implementation are described more fully in the description of FIG. 2A.

Additionally, access network (104) may include one or more small cell access points. In general, a small cell access points comprises a base station designed to provide cellular service to a small region such as a mall, campus, house or office. The small cell access point comprises its own cellular transmitter (e.g., a Home eNodeB, HeNB, in a 4G network). This transmitter is then connected to a broadband or other high-speed connection, which enables a connection to the core network (106). In one embodiment, a gateway is situated between the small cell access point and the core network (106). In these embodiments, the gateway may connect to multiple small cell access points and multiplex traffic between the small cell access points and the core network (106). In some embodiments, traffic received from the gateway or small cell access points is segmented from traffic received from larger base stations. In one embodiment, the traffic is segmented by flagging the traffic with an appropriate header or other indicators. Examples of small cell access points include, but are not limited to, femtocells, picocells, microcells, repeaters, and similar devices.

Figure 2A:
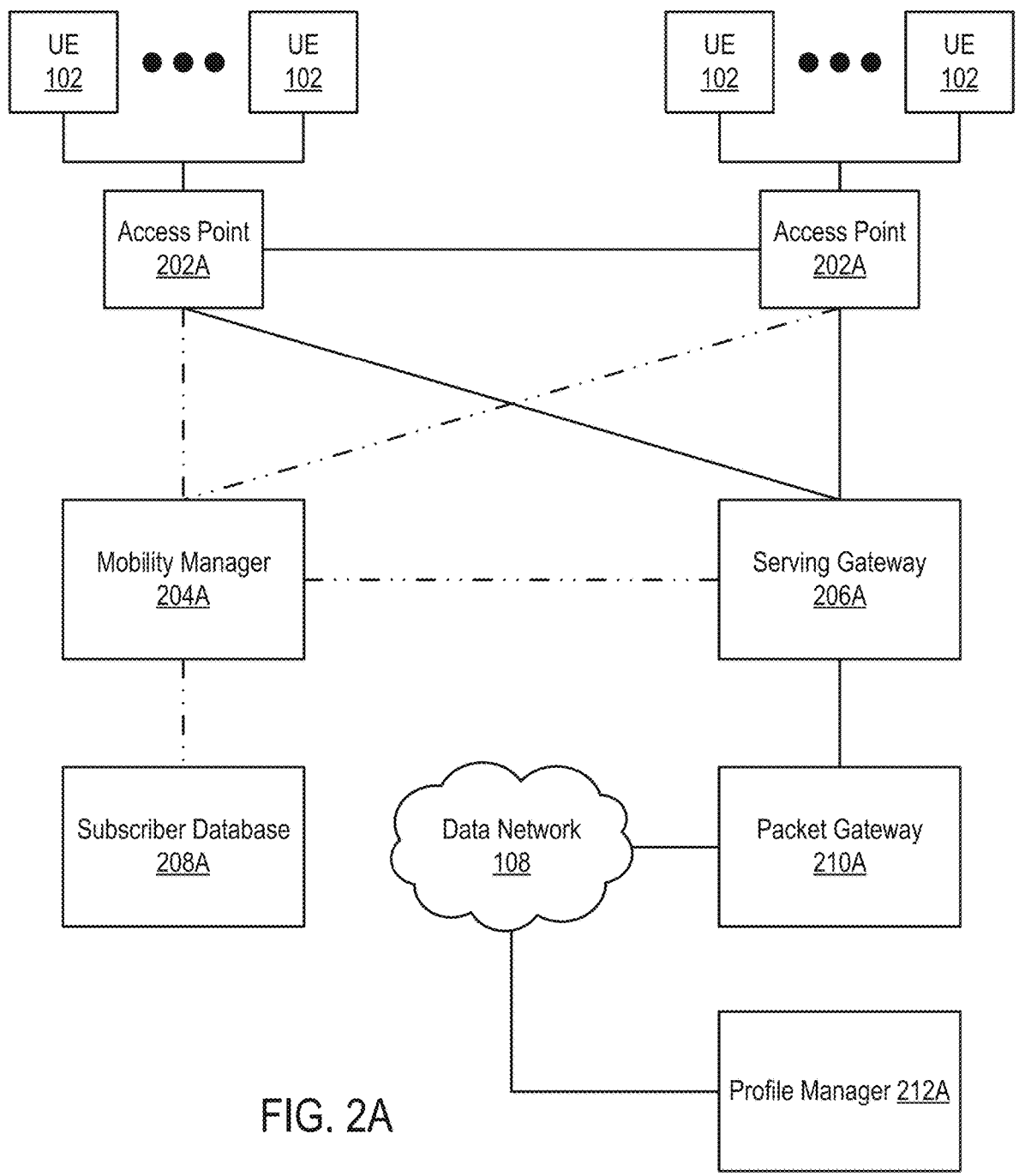
FIG. 2A is a block diagram illustrating a cellular network according to some embodiments of the disclosure.

FIG. 2A is a block diagram illustrating a cellular network according to some embodiments of the disclosure.

In the illustrated embodiment, UE (102) is communicatively connected to access points (202*a*). As seen in FIG. 2A, the access points (202*a*) form an access network such as a network (104). In one embodiment, the access points (202*a*) comprise eNodeB base stations connected to UE (102) via an air interface. embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (102). The eNodeB additionally includes multiple network interfaces for communicating with the core network and, specifically, mobility manager (204*a*) and serving gateway (206*a*). In one embodiment, the mobility manager (204*a*) comprises an MME in a 4G network. In the illustrated embodiment, solid lines between network elements (204*a*, 206*a*, 208*a*, and 210*a*) represent user data traffic while dashed lines between network elements (204*a*, 206*a*, 208*a*, and 210*a*) represent control or non-access stratum (NAS) traffic.

In another embodiment, the access points (202*a*) and UE (102) comprise a NextGen Radio Access Network (NG-RAN). In an embodiment, the access points (202*a*) comprise a plurality of gNodeB base stations connected to UE (102) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (102). The gNodeB additionally includes multiple network interfaces for communicating with the core network and, specifically, mobility manager (204*a*) and serving gateway (206*a*). In one embodiment, the mobility manager (204*a*) in a 5G network comprises an AMF. In one embodiment, the serving gateway (206*a*) comprises an SMF for control data or UPF for user data.

In the illustrated embodiment, the mobility manager (204*a*) manages control plane traffic while the gateway elements (206*a*, 210*a*) manage user data traffic. Specifically, the mobility manager (204*a*) may comprise hardware or software for handling network attachment requests from UE (102). These network attachment requests include emergency attach requests, as discussed in more detail herein. As part of processing these requests, the mobility manager (204*a*) accesses a subscriber database (208*a*). The subscriber database (208*a*) comprises hardware or software that stores user authorization and authentication data and validates users to the network. In one embodiment, the subscriber database (208*a*) may comprise an HSS in a 4G network. In some embodiments, the subscriber database (208*a*) may comprise a UDM and UDR in a 5G network. In one embodiment, the subscriber database (208*a*) may also store a location of the user updated via a Diameter or similar protocol.

The mobility manager (204*a*) may also be configured to create data sessions or bearers between UE (102) and serving gateway (206*a*) or packet gateway (210*a*). In one embodiment, the serving gateway (206*a*) and packet gateway (210*a*) may comprise single or separate devices. In general, the serving gateway (206*a*) routes and forwards user data packets while also acting as the mobility anchor for the user plane during access point handovers and as the anchor for mobility between different network technologies. For idle state UE (102), the serving gateway (206*a*) terminates the downlink data path and triggers paging when downlink data arrives for the UE (102). The serving gateway (206a) manages and stores UE (102) contexts, e.g., parameters of the IP bearer service, network internal routing information. In a 4G network, the serving gateway (206a) may be implemented by an S-GW. In a 5G network, the serving gateway (206a) may be implemented by an SMF.

The serving gateway (206a) is communicatively coupled to a packet gateway (210a). In general, the packet gateway (210a) provides connectivity from the UE (102) to external packet data networks (PDNs) such as data network (108) by being the point of exit and entry of traffic to external networks (e.g., 108). UE (102) may have simultaneous connectivity with more than one packet gateway (210a) for accessing multiple packet data networks. The packet gateway (210a) performs policy enforcement, packet filtering for each user, charging support, lawful interception, and packet screening. In the illustrated embodiment, the packet gateway (210a) also limits access to endpoints such as profile manager (212a) when an emergency data session is established, as will be discussed. In a 4G network, the packet gateway (210a) may be implemented by a P-GW. In a 5G network, the packet gateway (210a) may be implemented by a UPF.

In the illustrated embodiment, a profile manager (212a) is communicatively coupled to the core network via the data network (108). In one embodiment, the data network (108) may comprise the Internet. The profile manager (212a) securely packages UE profiles that are ready to be provisioned on an eSIM or eUICC, of a UE and installs the profiles onto the eUICC or eSIM. In the illustrated embodiment, a Subscription Manager Data Preparation (SM-DP) may be utilized as the storage layer for SIM credentials. In an embodiment, a Subscription Manager Secure Routing (SM-SR) may also be used to deliver the operator credentials to the eUICC/eSIM, and then, once the credentials are installed, remotely manages the SIM thereafter. In a consumer solution, an SM-DP+ may be used. In an embodiment, the SM-DP+ is responsible for the creation, download, remote management (enable, disable, update, delete), and the protection of operator credentials (the mobile profile). an SM-DP+ may encapsulate the functions of both the SM-DP and the SM-SR of the M2M solution. The SM-SR may be responsible for managing the status of Profiles on the eUICC/eSIM (enable, disable, delete). It also may secure the communications link between the eUICC/eSIM and SM-DP for the delivery of mobile profiles. As will be discussed, after the mobility manager (204a) establishes an emergency data session between UE (102) and serving gateway (206a), the UE (102) may communicate over a network (108) to download mobile profiles from the profile manager (212a).

In one embodiment, the access points (202a) and network elements (204a, 206a, 208a, 210a) of the core network may be operated by a public mobile network operator (MNO). In another embodiment, the access points (202a) and network elements (204a, 206a, 208a, 210a) may be operated by a private enterprise and comprise a closed or private network. In an embodiment, the network elements (204a, 206a, 208a, 210a) may comprise a single computing device implementing all the features of the elements. Further, a single or multiple access points (202a) may be deployed in a fixed region (e.g., a warehouse or factory) to provide a small-scale cellular network. In an embodiment, a private enterprise may simulate a cellular core network. The simulated core network may still be connected via a broadband connection to a data network (108), and the profile manager (212a) may remain unchanged.

Figure 2B:
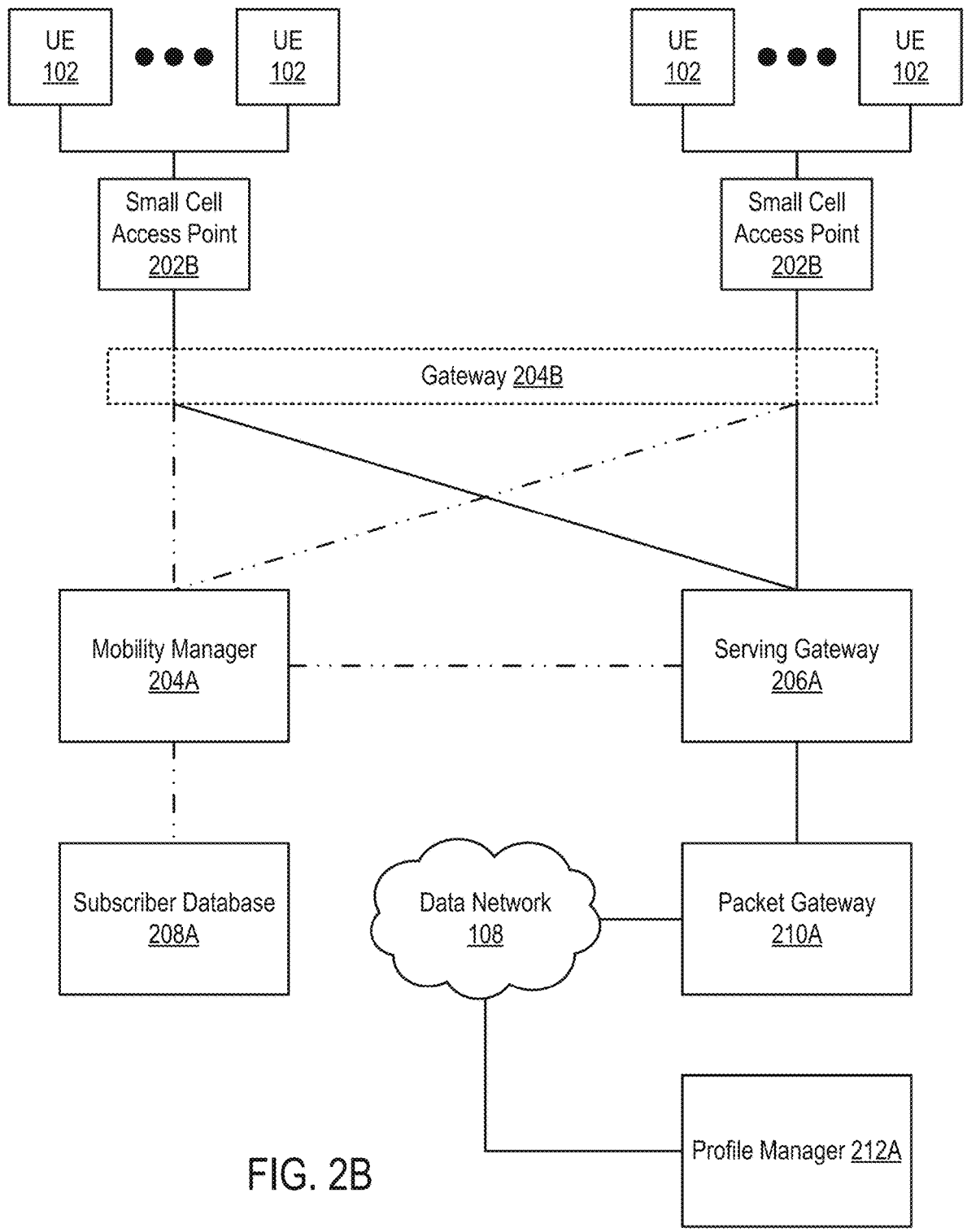
FIG. 2B is a block diagram illustrating a cellular network according to some embodiments of the disclosure.

FIG. 2B is a block diagram illustrating a cellular network according to some embodiments of the disclosure. Numerous elements (102, 204a, 206a, 208a, 210a, 212a, 108) have been described in the description of FIG. 2A, and that description is not repeated herein. Specifically, UE (102), the core network (204a, 206a, 208a, 210a), profile manager (212a), and the data network (108) may operate identically to that described in FIG. 2A.

In contrast to FIG. 2A, FIG. 2B may represent a network with small cell access points (202b). In one embodiment, a small cell access point (202b) comprises a small, low-power cellular base station, typically designed for use in a home, office, or small business. In some embodiments, repeater, femtocell, picocell or microcell access points (alone or in combination) may be utilized as access points (202b). In the illustrated embodiment, a given small cell access point (202b) may communicate with the core network (e.g., via 204a, 206a) over a broadband Internet connection. In some embodiments, this broadband Internet connection comprises a wired connection (e.g., cable, fiber optic, etc.) while in other embodiments the broadband Internet connection may comprise a wireless connection (e.g., satellite, cellular, etc.). Further, in some embodiments, various combinations of wired and wireless technologies may be utilized to provide broadband Internet access. Thus, a small cell access point (202b) may be installed at any location that provides such connectivity. In a 4G network, the small cell access point (202b) may be referred to as a Home eNodeB (HeNB). In a 5G network, the small cell access point (202b) may be referred to as a Home gNodeB (HgNB).

In one embodiment, the network may include an optional gateway (204b). In the illustrated embodiment, the gateway (204b) comprises a hardware or software device that multiplexes communication from multiple small cell access points (202b). If present, the gateway (204b) aggregates traffic from multiple small cell access points (204a) back into an existing core service network (e.g., via 204a, 206a) through a standard S1 interface.

In some embodiments, small cell access points (202b) may specifically be deployed only to allow emergency sessions. In this manner, all traffic from access points (202b) and gateway (204b) may be tagged as emergency traffic. In this manner, any traffic using small cell access points (202b) may be limited to an emergency data session, as described in more detail herein. By contrast, in the embodiment of FIG. 2A, the access points (202a) may handle both regular and emergency session traffic.

Figure 3A:
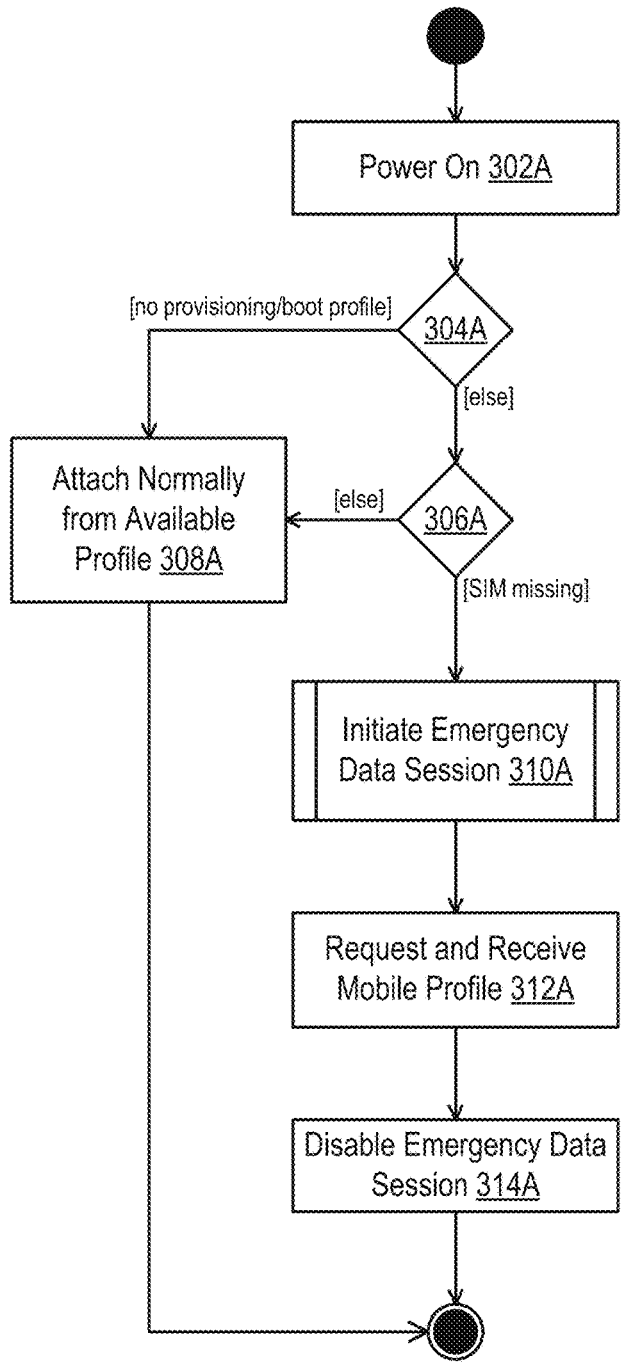
FIG. 3A is a flow diagram illustrating a method for downloading a mobile profile via an emergency data session according to some embodiments of the disclosure.

FIG. 3A is a flow diagram illustrating a method for downloading a mobile profile initiated via an emergency data session according to some embodiments of the disclosure.

In step 302a, the method comprises powering on a UE. In some embodiments, the powering on comprises an initial power-on (i.e., the first power on after manufacturing of the device). In other embodiments, the power-on may comprise a power-on after reset. Thus, in these embodiments, the powering on of the UE may occur after an initial power-on.

In steps 304a and 306a, the method comprises executing a series of checks to determine whether an emergency data session is needed. The steps can be performed in the illustrated order or in the reverse order. In general, steps 304a and 306a comprise detecting that a useable mobile profile is not stored by the UE.

After power on at 302a, at 304a it is determined if a mobile profile exists. In one embodiment, a UE includes a programmable device that stores mobile profiles. Examples of such a programmable device include eSIM, eUICC, SSP, and iUICC or Integrated SIM (iSIM) devices. As used herein, SSP refers to a standardized platform implementing iUICC as implemented by, for example, European Telecommunications Standards Institute (ETSI). In these embodiments, the method queries the programmable device to determine if the device includes a provisioning or boot profile that can be used to access a cellular network. In some embodiments, the method may also determine if an active profile exists. If any such profile exists, the method determines that the device is capable of accessing a cellular network using such a profile and attaches the UE using the available profile in step 308a. In these embodiments, the method comprises attaching the UE to a cellular network using a non-emergency attach procedure.

If, however, the method determines that no mobile profile exists, in step 306a, it determines if a SIM or UICC is present in the UE. In some embodiments, the method operates on a UE that includes both a physical SIM/UICC as well as one or more eSIM, eUICC, SSP, or iUICC/iSIM devices. In these embodiments, the method confirms that both the programmable devices (e.g., eSIM, eUICC, SSP, of iUICC/iSIM) do not include a mobile profile and that a SIM or UICC is not present. If the method determines that a SIM or UICC is present, the method determines that the device is capable of accessing a cellular network using such a profile and provisions the device using the available profile in step 308a. In these embodiments, the method comprises attaching the UE to a cellular network using a non-emergency attach procedure.

In some embodiments, the method may only include either step 304a or 306a and not both. For example, if a UE does not support traditional SIM and UICC devices, the method may only execute step 304a. Alternatively, if the UE does not include a programmable device, the method may only execute step 306a.

At 310a, the method initiates an emergency data session upon determining that one or both of the determinations in steps 304a and 306a fail. That is, the method may only execute step 310a if no mobile profile can be identified in steps 304a and 306a. Details of establishing an emergency session are described more fully in the description of FIG. 3B.

Figure 3B:
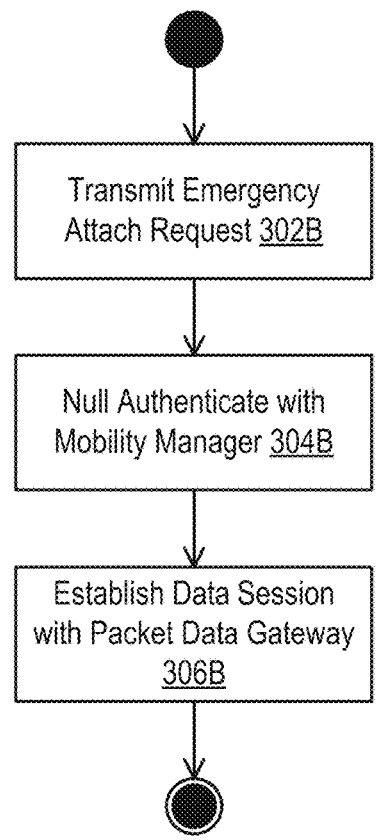
FIG. 3B is a flow diagram illustrating a method for establishing an emergency session according to some embodiments.

FIG. 3B is a flow diagram illustrating a method for establishing an emergency session according to some embodiments.

In step 302b, the method comprises transmitting an emergency attach request to a cellular base station.

In one embodiment, the attach request may comprise an initial attached marked as an emergency attach. In one embodiment, the method may comprise transmitting the emergency attach request to a base station. In one embodiment, this base station may comprise a 4G or 5G base station. In a 4G network, the base station may comprise an eNodeB. Alternatively, in some embodiments, the base station of a 4G network may comprise a Home eNodeB implemented in a femtocell or other small cell access point. In a 5G network, the base station may comprise a gNodeB, a HgNB femtocell, or other small cell access point.

Upon determining that no mobile profile is available, the method may first identify a unique MCC and MNC pair. In some embodiments, MCC and MNC values comprise values adhering to ITU-T Recommendation E.212 or any similar standard. In one embodiment, an MCC comprises a three-digit code associated with a geographic region and country. In some embodiments, the first digit of the MCC corresponds to a broad region (e.g., test network, continent, etc.) while the final two digits segment the region based on country or other geographical or logical boundaries. An MNC likewise comprises a two- or three-digit code that is assigned to a network operator and, more specifically, to a network operated by such a network operator. A combination of an MCC with an MNC can be referred to as an MCC/MNC tuple or public land mobile network (PLMN) code.

In some embodiments, the MCC/MNC tuple may comprise a unique pair of values not used by any mobile network or otherwise reserved for emergency services. For example, an MCC having few associated MNC values (e.g., Tuvalu, 553) may be selected, and an unused MNC value may be selected to form the MCC/MNC tuple. In these embodiments, the MCC may be selected in reverse numerical order (starting at 999 or 99) if the existing MNC start in order (starting at 001 or 01). Alternatively, an unused MCC value may be used (e.g., 556), and an arbitrary MNC value may be utilized. In general, as with before, a high MCC value can be utilized to avoid potential conflicts. In another embodiment, an existing MCC associated with a given network operator (e.g., 310, United States) and an available MNC within that region may be used. In another embodiment, special MCC values (e.g., 0XX, 9XX) may be used, and non-conflicting MNC values may be used in combination with these special MCC values. In general, any MCC/MNC tuple may be used, provided that it does not conflict with an active MCC/MNC tuple of a network operator.

After performing random access procedure (RAP) and radio resource control (RRC) signaling (not illustrated), the UE issues an attach request message to the base station that includes the unique MCC/MNC pair. In one embodiment, a type field of the attach request can be set to "emergency." In this scenario, existing emergency attach techniques implemented for voice communications may be re-used, as modified herein. In some embodiments, the MCC/MNC pair is included in the attach request message as part of a mobile identity such as an IMSI. In other embodiments, other types of formatted identities may be used, such as an International Mobile Equipment Identity (IMEI) value. In general, an IMSI includes the MCC/MNC tuple and a subscriber identifier.

The base station transmits the IMSI to a mobility manager. In a 4G network, the mobility manager may comprise a Mobility Management Entity (MME), while in a 5G network, the mobility manager may comprise an AMF and/or SMF. The mobility manager authenticates the MCC/MNC tuple to a subscriber database. In some embodiments, the subscriber database comprises an HSS in a 4G network. In some embodiments, the subscriber database may comprise a UDM and UDR in a 5G network.

In some embodiments, the transmission from the mobility manager to the subscriber database may include a null value for a subscriber identifier. The subscriber database may be modified to detect this null subscriber identifier and confirm that the MCC/MNC tuple matches a known unique tuple. In response, the subscriber database may generate one or more authentication vectors and return these vectors to the mobility manager in an authentication information answer. At least one of these vectors may be generated using the MCC/MNC tuple. In some embodiments, the vectors include a random number generated by the subscriber database (RAND), an authentication token (AUTN), an internal vector not share with the UE (XRES), and a top-level authorization key cryptographically generated by the subscriber server ($K_{ASME}$). In response, the mobility manager sends some of the above vectors to the UE. In some embodiments, the mobility manager sends the random value (RAND) and token (AUTN).

In step 302b, the method comprises null authenticating with the mobility manager. In response to receiving authentication data, the method confirms the value of AUTN independently using the value of RAND. The UE further calculates its own authentication vector (RES) and transmits this vector to the mobility manager. The mobility manager confirms that RES is equal to XRES to finalize authenticating the user.

In step 306b, the method comprises establishing a data session with a packet gateway. After authenticating the UE, the mobility manager establishes a session with a serving and packet gateway and completes the attachment with the UE. Once the attachment is complete, an emergency data session is established between the packet gateway and the UE, and the UE can access data networks via the packet gateway. In one embodiment, however, the emergency data session is limited in the network endpoints it may access. Specifically, the serving and/or packet gateway may restrict data transmission across the emergency bearer to a profile manager such as a Subscription Manager Data Preparation (SM-DP) module.

Figure 4:
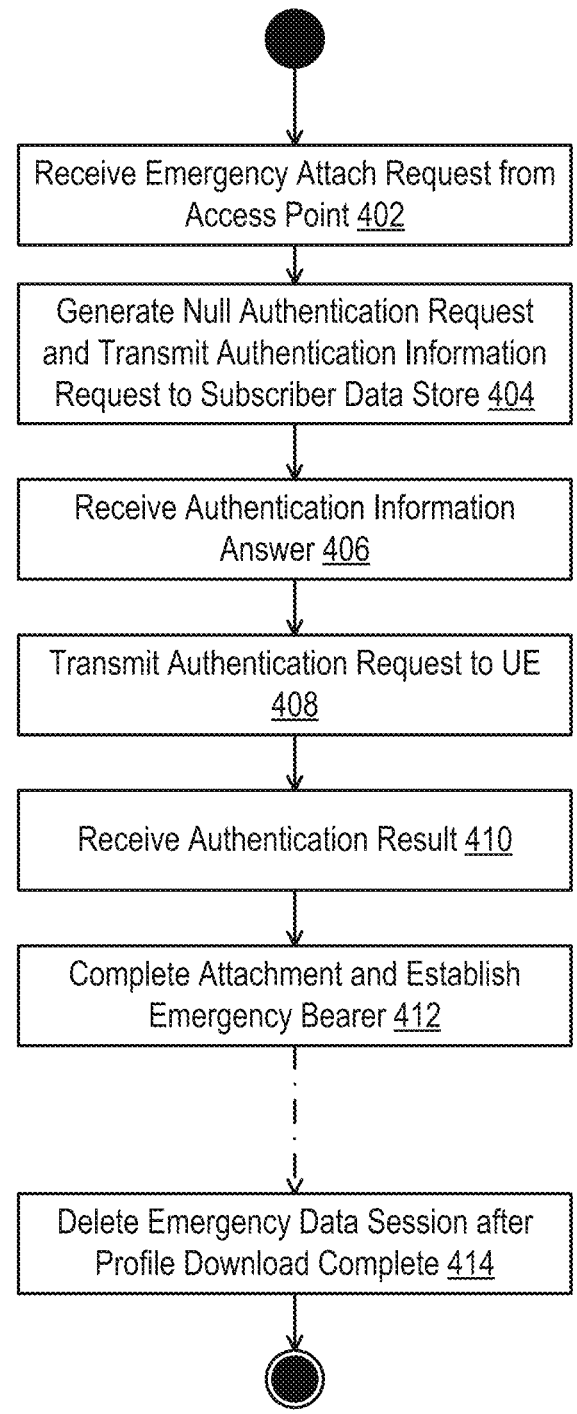
FIG. 4 is a flow diagram illustrating a method for establishing an emergency data session according to some embodiments of the disclosure.
Figure 5:
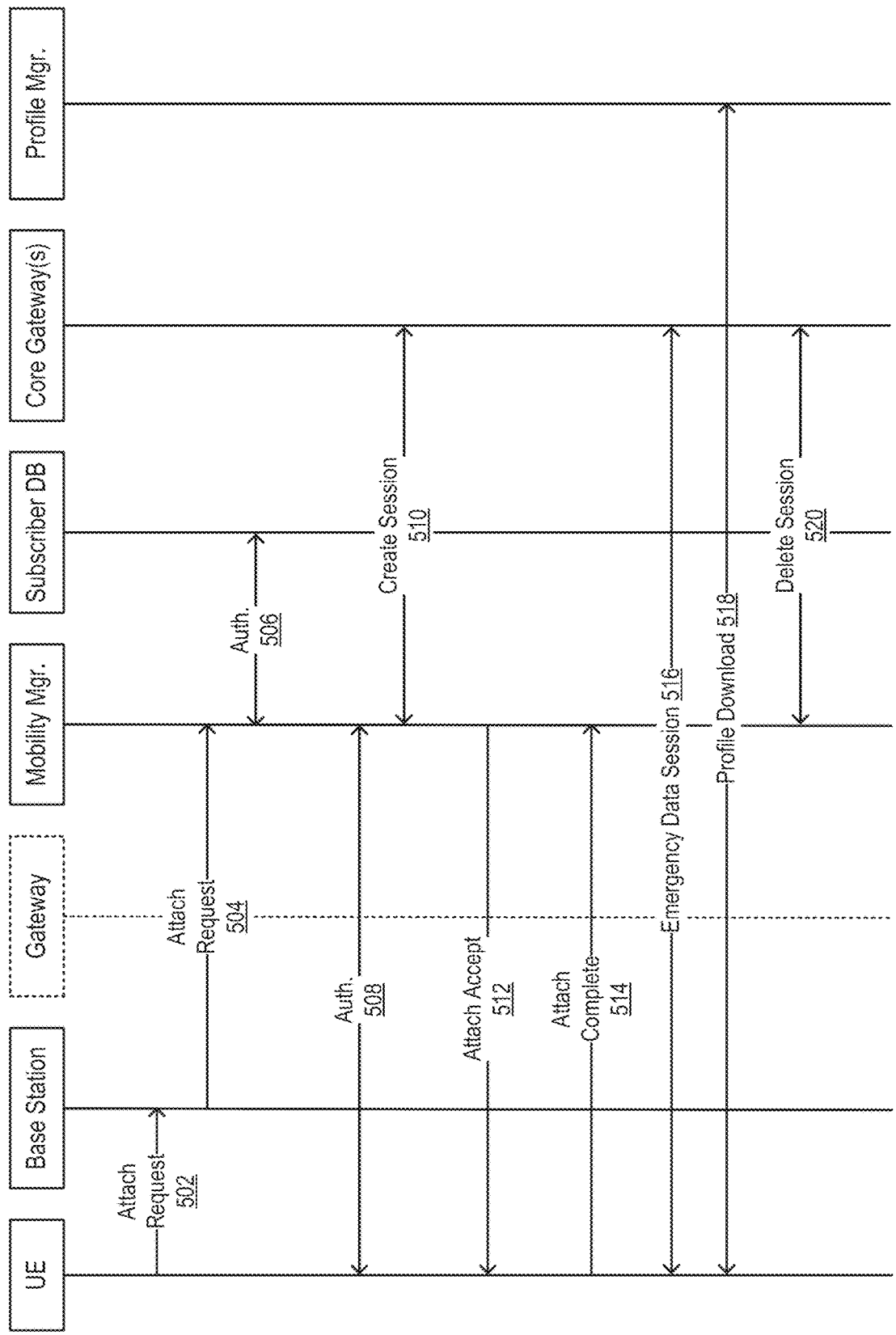
FIG. 5 is a call flow diagram illustrating a method for establishing an emergency session according to some embodiments.

Various details regarding operations of devices communicatively coupled to UE are described more fully in FIGS. 4 through 5, and reference is made to those descriptions.

Returning to FIG. 3A, in step 312a, the method includes requesting and receiving a mobile profile. In one embodiment, the emergency data session configured in step 310a may allow traffic between the UE and a profile manager. In one embodiment, the profile manager stores or generates mobile profiles (e.g., SIM profiles) for the UE. In one embodiment, the profile manager is operable to receive an IMEI or similar identifying value of a UE and retrieve or generate a mobile profile for the UE. In one embodiment, the mobile profile includes an integrated circuit card identifier (ICCID), an IMSI, an authentication key, and other data.

In some embodiments, the UE establishes a data session with the profile manager and transmits the identifying information (e.g., IMEI) to the profile manager to request a mobile profile. The profile manager validates the IMEI and identifies a responsive mobile profile to return to the UE over the data session. As indicated above, the data session operates over an emergency bearer service while in the mobile network. Thus, all communications between the profile manager and the UE pass through at least the packet gateway. In this manner, the packet gateway can employ content filtering operations to selectively only allow communications between the UE and the profile manager while disallowing communications with other packet services.

In step 314a, once the UE receives the mobile profile, it disables the emergency data session. In one embodiment, the UE writes the received (or active) mobile profile to a programmable device such as an eSIM, eUICC, SSP, or iUICC/iSIM. In some embodiments, the UE may also receive an operating system for the programmable device in addition to the mobile profile. In these embodiments, the method may further comprise writing the operating system to the programmable device.

In one embodiment, the method may disable the current emergency data session in step 314. In an embodiment, the method may comprise issuing a detach request to the mobility manager. In response, the mobility manager destroys the session established with the serving and packet gateways. After destroying the session, the mobility manager transmits an accept message to the UE, ending the session.

Alternatively, or in conjunction with the foregoing, the method may further comprise disabling the method for future power cycles. In an embodiment, the UE has written the mobile profile to the programmable device. Thus, to prevent invocations of the method, the UE may disable the method of FIG. 3A to prevent unnecessary processing. In some embodiments, the checks in step 304a and 306a inherently prevent the establishment of the emergency data session. Namely, step 304a may determine that the mobile profile exists in the programmable device and thus attaches the UE to a mobile network normally in step 308a.

FIG. 4 is a flow diagram illustrating a method for establishing an emergency data session according to some embodiments of the disclosure. In an embodiment, the method of FIG. 4 may be performed by a mobility manager such as an MME in a 4G network or AMF and SMF of a 5G network.

In block 402, the method comprises receiving an emergency attach request from an access point. In an embodiment, the access point comprises a cellular base station. In one embodiment, the cellular base station comprises an eNodeB or gNodeB. In one embodiment, a UE issues the emergency attach request to the access point over an air interface, and the access point forwards the emergency attach request over a network interface. In one embodiment, the access point comprises a femtocell cellular receiver. In one embodiment, the femtocell cellular receiver comprises a HeNB. In one embodiment, a UE issues the emergency attach request over an air interface to the HeNB, which then forwards the request over a network interface to the mobility manager. In one embodiment, a gateway device aggregates traffic from multiple small cell access points. In these embodiments, the small cell access points forward the requests to the gateway, which transmits the attach requests over a network interface to the mobility manager.

In one embodiment, the emergency attach request may comprise two messages: one from the UE to the access point and one from the access point to the mobility manager. In one embodiment, the request from the UE to the access point may comprise an RRC connection setup complete message. In one embodiment, the RRC connection setup complete message includes a PLMN identity which comprises an MCC/MNC tuple. As discussed above, this tuple may comprise a unique MCC/MNC tuple not used by a cellular network. In one embodiment, the access point transmits a second message to the mobility manager. In one embodiment, this message may comprise an Initial UE Message. In one embodiment, this second message may set a message type of "emergency." In one embodiment, this type may be embedded in an establishment clause of the Initial UE Message. In one embodiment, the MCC/MNC tuple in the first message may be included in the second message. For example, the tuple may be included in a tracking area identifier (TAI) of the second message. Thus, the method may extract this tuple from the emergency attach request.

In one embodiment, a mobility manager implementing the method may receive non-emergency requests for attachment. Thus, in some embodiments, the method may include a check to confirm that the MCC/MNC tuple in the request is indeed a unique MCC/MNC tuple that should trigger an emergency data session. In this manner, the method may store a list of known, unique tuples and determine if the received tuple matches a tuple in this list. If not, the mobility manager may process the network attachment according to the relevant cellular network standards, which are not elaborated on in detail herein.

In step 404, the method comprises generating a null-authentication request and transmits the null-authentication request to a subscriber database. In one embodiment, the null-authentication request is issued as a Diameter or other Authentication, Authorization, and Accounting (AAA) protocol. The Diameter protocol is used as an example, but other AAA protocols may be used.

In one embodiment, the mobility manager generates an authentication request. In some embodiments, the authentication request may include a null value for a subscriber identifier (e.g., IMSI) as compared to normal requests, which include a unique IMSI. The subscriber database may be modified to detect this null subscriber identifier and confirm that the MCC/MNC tuple matches a known unique tuple.

In step 406, the method comprises receiving an authentication answer. In one embodiment, the subscriber database may generate one or more authentication vectors and return these vectors to the mobility manager in an authentication information answer. At least one of these vectors may be generated using the MCC/MNC tuple. In some embodiments, the vectors include a random number generated by the subscriber database (RAND), an authentication token (AUTN), an internal vector not shared with the UE (XRES), and a top-level authorization key cryptographically generated by the subscriber server ($K_{ASME}$).

In step 408, the method comprises transmitting an authentication request to the UE. In one embodiment, some of the above vectors received from the subscriber database are transmitted to the UE as part of the authentication request. In some embodiments, the mobility manager sends the random value (RAND) and token (AUTN).

In step 410, the method comprises receiving an authentication result from the UE in response to the authentication request. In response to receiving authentication data, the UE confirms the value of AUTN independently using the value of RAND. The UE further calculates its own authentication vector (RES) and transmits this vector as the authentication result to the mobility manager. The method may then confirm that RES is equal to XRES to finalize authenticating the UE.

In step 412, the method comprises completing the attachment and establishing an emergency bearer. In one embodiment, step 412 may comprise multiple sub-steps.

In one embodiment, the method includes transmitting a request to a serving gateway to create a new session. In one embodiment, this request may comprise a General Packet Radio Service (GPRS) Tunneling Protocol (GTP) create session request. In one embodiment, the request includes the MCC/MNC tuple. For example, in a GTP create session request, an IMSI is generally included. In one embodiment, the method may use the MCC and MNC as part of the IMSI and use arbitrary values as the subscriber identifier portion of the IMSI. In this manner, the receiving entity (e.g., serving gateway) can quickly identify sessions established as emergency data services. The serving gateway may, in turn, transmit a request to a packet gateway to create a new session. Similarly, the serving gateway may be configured to forward the MCC/MNC tuple to the packet gateway, which performs a similar flagging of emergency MCC/MNC tuples. The packet gateway returns session identifying data to the serving gateway, which returns the session identifying data to the method. The method will ultimately forward the session identifying data to the UE via the access point as an attachment acceptance message. Finally, the UE will acknowledge the attachment acceptance message with an attach complete message and will then be capable of communicating over the emergency data session. In some embodiments, the serving gateway and packet gateway described above may comprise the same physical or logical device.

As illustrated and discussed more fully in FIG. 5, the UE may then have limited data access using the emergency data session. Ultimately, in step 414, the method will delete the emergency data session after a UE has successfully downloaded a mobile profile. As illustrated, the dashed line between step 412 and step 414 illustrates a passage of time between the steps. Specifically, during this time the UE may download a mobile profile from a profile manager during this time period.

In one embodiment, the UE will affirmatively detach once the profile is downloaded. In an embodiment, the method will receive a detach request from the UE and transmit a delete session request to the serving gateway, which deletes the session from its session table and returns an acknowledgment. The method will then acknowledge the detachment to the UE.

In an alternative embodiment, the core network will detect the completed downloading of a mobile profile since the profile passes through the emergency bearer. In an embodiment, the method awaits confirmation that the UE has received the mobile profile and issues a detach request to the UE. The UE will confirm the download and issue a detach accept message to the method to confirm detachment. After, the method may include deleting the session with a serving gateway, as described above.

FIG. 5 is a call flow diagram illustrating a method for establishing an emergency session according to some embodiments.

In the illustrated embodiment, a UE issues an attach request (502) to a base station. As described, this base station may comprise an eNodeB, gNodeB, femtocell or other small cell access point. In one embodiment, the attach request may comprise an initial attached marked as an emergency attach. In one embodiment, the method may comprise transmitting the emergency attach request to the base station. Further details of the attach request are provided in step 302b of FIG. 3B and are not repeated herein.

The base station then forwards the attach request to a mobility manager (504). If a femtocell gateway is utilized, the gateway forwards this request on behalf of the base station. Details of this step are provided in the description of step 402 of FIG. 4.

The mobility manager receives the attach request and null-authenticates the UE with the subscriber database (506). Further, the mobility manager communicates with the UE to allow the UE to authenticate the return value from the subscriber database (508). In one embodiment, the null authentication request is issued as a Diameter or other AAA protocol. The Diameter protocol is used as an example, but other AAA protocols may be used. In one embodiment, the mobility manager generates an authentication request. In some embodiments, the authentication request may include a null value for a subscriber identifier (e.g., IMSI) as compared to normal requests, which include a unique IMSI. The subscriber database may be modified to detect this null subscriber identifier and confirm that the MCC/MNC tuple matches a known unique tuple.

In the illustrated embodiment, the subscriber data store identifies the null authentication and bypasses standard authorization controls. Specifically, the subscriber database immediately can authenticate the user based on the unique MCC/MNC tuple and does not require further processing of the authentication request to proceed. As a result, the subscriber database returns a successful authentication result. The mobility manager forwards authentication vectors to the UE for confirmation (508) and receives a confirmation result completing the authentication. Further details are provided previously in the description of inter alia step 406.

After authenticating the UE, the mobility manager creates a session with the core gateway(s) (e.g., serving or packet gateway) (510). In one embodiment, a core gateway maintains a table of active sessions and properties of such sessions. In one embodiment, the core gateways establish an emergency session whereby various filters are used to limit data traffic between UEs and external network elements such as the profile manager. In the illustrated embodiment, the core gateway(s) add an emergency session to this table in response to the request (510) and returns details regarding the session to the mobility manager.

In one embodiment, the request (510) includes the MCC/MNC tuple. For example, in a GTP create session request, an IMSI is generally included. In one embodiment, the method may use the MCC/MNC is part of the IMSI and use arbitrary values as the subscriber identifier portion of the IMSI. In this manner, the core gateway (e.g., serving gateway) can quickly identify sessions established as emergency data services. The serving gateway may, in turn, transmit a request to a packet gateway to create a new session. Similarly, the serving gateway may be configured to forward the MCC/MNC tuple to the packet gateway, which performs a similar flagging of emergency MCC/MNC tuples. The packet gateway returns session identifying data to the serving gateway, which returns the session identifying data to the method. The mobility manager will ultimately forward the session identifying data to the UE via the access point as an attachment acceptance message (512). Finally, the UE will acknowledge the attachment acceptance message with an attach complete message (514) and will then be capable of communicating over the emergency data session (516).

Once an emergency data session is established between UE and core gateways, the UE initiates a download of a mobile profile (518). In one embodiment, the UE issues a network request via the core gateways to the profile manager. This request may comprise, for example, a Hypertext Transfer Protocol (HTTP) request. The request may include identifying information (e.g., IMEI) that allows the profile manager to identify the relevant mobile profile. The profile manager transmits the mobile profile through the core gateway(s) to the UE. As discussed above, in some embodiments, the core gateway(s) are configured to block all data from leaving the core network except for communications to a profile manager. Thus, the UE may have data connectivity limited to retrieving mobile profiles from the profile manager.

In the illustrated embodiment, once the profile download is complete, the mobility manager deletes the session (520). In one embodiment, the mobility manager issues a request to delete the session to the core gateway(s). The core gateways then remove the session from the session table and return an acknowledgment to the mobility manager. In some embodiments, the mobility manager may similarly remove the session from its own session table (if implemented). The mobility manager may then send an acknowledgment to the UE.

In one embodiment, after the session is terminated, the UE may then disable any future creations of emergency data sessions. That is, the UE may be configured to only execute the processes described herein one time (e.g., on power-on). In another embodiment, the UE may only disable emergency data functionality upon confirming that the mobile profile was successfully downloaded and installed. In another embodiment, the UE may only disable emergency data sessions when confirming that the mobile profile allows for mobile data connectivity.

Figure 6:
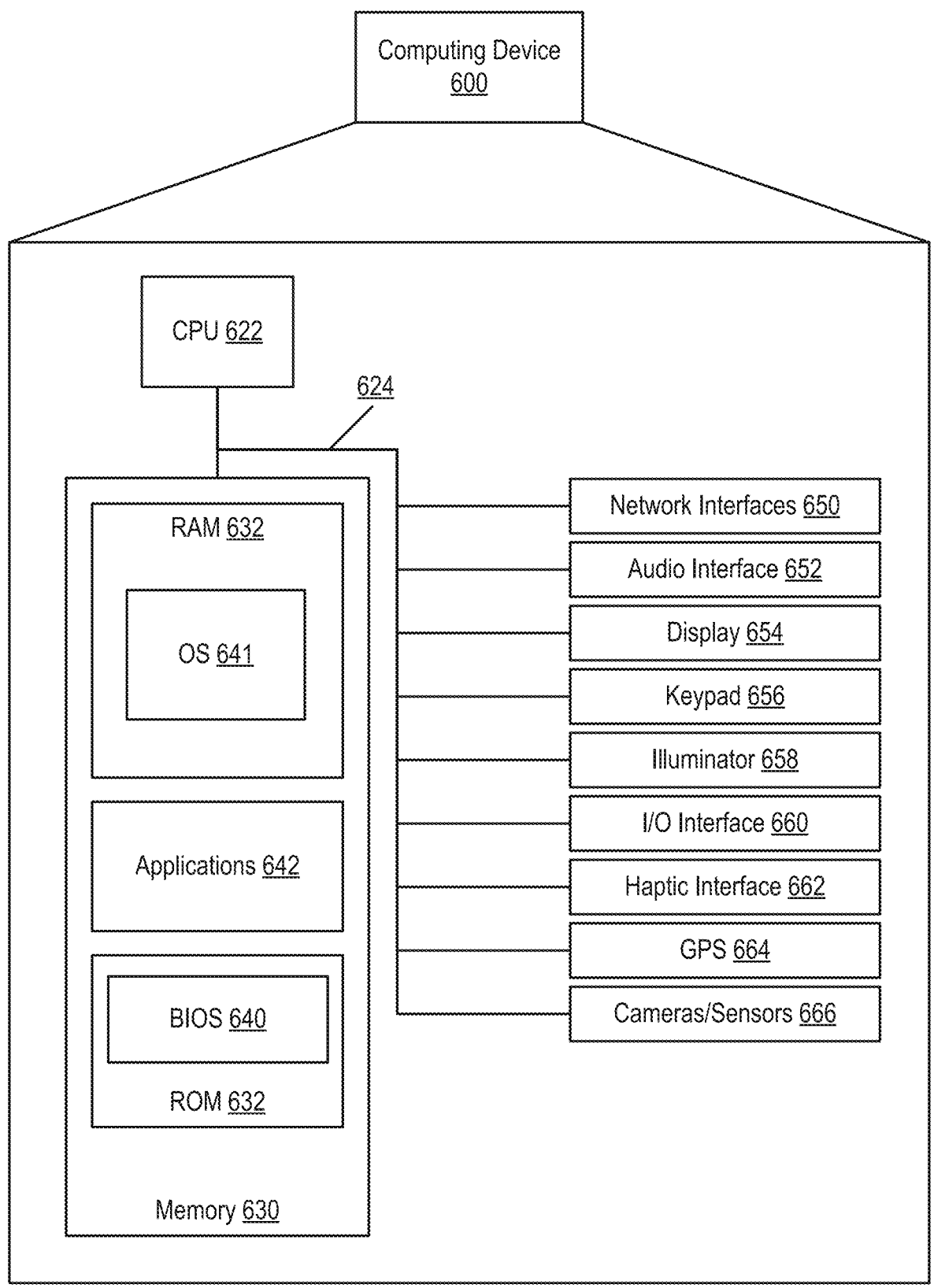
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device (600) may include more or fewer components than those shown in FIG. 6, depending on the deployment or usage of the device (600). For example, a server computing device, such as a rack-mounted server, may not include audio interfaces (652), displays (654), keypads (656), illuminators (658), haptic interfaces (664), Global Positioning Service (GPS) receivers (664), or cameras/sensors (666). Some devices may include additional components not shown, such as graphics processing unit (GPU) devices, cryptographic co-processors, artificial intelligence (AI) accelerators, or other peripheral devices.

As shown in the figure, the device (600) includes a central processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666) or a plurality of cameras/sensors (666). The positioning of the camera(s)/sensor(s) (666) on the device (600) can change per device (600) model, per device (600) capabilities, and the like, or some combination thereof.

In some embodiments, the CPU (622) may comprise a general-purpose CPU. The CPU (622) may comprise a single-core or multiple-core CPU. The CPU (622) may comprise a system-on-a-chip (SoC) or a similar embedded system. In some embodiments, a GPU may be used in place of, or in combination with, a CPU (622). Mass memory (630) may comprise a dynamic random-access memory (DRAM) device, a static random-access memory device (SRAM), or a Flash (e.g., NAND Flash) memory device. In some embodiments, mass memory (630) may comprise a combination of such memory types. In one embodiment, the bus (624) may comprise a Peripheral Component Interconnect Express (PCIe) bus. In some embodiments, the bus (624) may comprise multiple busses instead of a single bus.

Mass memory (630) illustrates another example of computer storage media for the storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) may then read the software or data from RAM (632), process them, and store them to RAM (632) again.

The computing device (600) may optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises an input/output interface (660) for communicating with external devices, using communication technologies, such as USB, infrared, Bluetooth™, or the like. The haptic interface (662) provides tactile feedback to a user of the client device.

The optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
receiving, at a mobility manager in a core network, an attach request from a User Equipment (UE), the attach request including a pre-configured mobile country code (MCC) and mobile network code (MNC) to establish a data session through the core network, the core network providing connectivity to the Internet;
transmitting, by the mobility manager, a null-authentication request for the UE to a subscriber database in the core network and receiving a successful authentication response from the subscriber database responsive to the null-authentication request, the null-authentication request including a null value for a subscriber identifier and including the MCC and MNC;
establishing, by the mobility manager via a packet gateway, an emergency data session between the UE and a mobile profile manager external to the core network after successfully authenticating with the core network, the emergency data session allowing traffic between the mobile profile manager and the UE through the core network; and
transmitting, to the UE via the packet gateway, a mobile profile from the mobile profile manager to the UE using the emergency data session.

2. The method of claim 1, wherein the subscriber database is configured to detect the MCC and MNC and authenticate the UE without accessing a subscriber identifier.

3. The method of claim 1, further comprising disallowing, by the packet gateway, traffic to external network devices other than the mobile profile manager based on the emergency data session, an external network device comprising a network device external to a gateway device in the core network and communicatively connected to a public data network.

4. The method of claim 1, wherein receiving the attach request comprises receiving the attach request from a small cell access point.

5. The method of claim 1, further comprising deleting, by the mobility manager, the emergency data session in response to a successful download of the mobile profile.

6. A non-transitory computer-readable storage medium for storing instructions capable of being executed by a processor, the instructions defining steps of:
receiving, at a mobility manager in a core network, an attach request from a User Equipment (UE), the attach request including a pre-configured mobile country code (MCC) and mobile network code (MNC) to establish a data session through the core network, the core network providing connectivity to the Internet;
transmitting, by the mobility manager, a null-authentication request for the UE to a subscriber database in the core network and receiving a successful authentication response from the subscriber database responsive to the null-authentication request, the null-authentication request including a null value for a subscriber identifier and including the MCC and MNC;
establishing, by the mobility manager via a packet gateway, an emergency data session between the UE and a gateway device through the core network after successfully authenticating with the core network, the emergency data session allowing the UE to communicate with a mobile profile manager external to the core network via the gateway device; and
transmitting, via the packet gateway, a mobile profile from the mobile profile manager to the UE using the emergency data session.

7. The non-transitory computer-readable storage medium of claim 6, wherein receiving the attach request comprises receiving the attach request from a small cell access point.

8. The non-transitory computer-readable storage medium of claim 6, the null-authenticating comprising transmitting a null subscriber identifier with the MCC and MNC, the null subscriber identifier, MCC, and MNC combined as an International Mobile Subscriber Identity (IMSI) of an authentication request.

9. The non-transitory computer-readable storage medium of claim 6, the instructions further defining the step of deleting, by the mobility manager, the emergency data session in response to a successful download of the mobile profile.

10. The non-transitory computer-readable storage medium of claim 9, wherein deleting the emergency data session further comprises issuing, by the mobility manager, a detach request to the UE.

11. A system comprising:
a User Equipment (UE) configured to:
  detect that a mobile profile is not stored by the UE,
  identify a pre-configured mobile country code (MCC) and mobile network code (MNC) to establish a data session, and
  transmit an attachment request to a mobility manager in a core network, the attachment request including the MCC and MNC, the core network providing connectivity to the internet;
wherein the mobility manager is configured to:
  receive the attachment request including the MCC and MNC from the UE,
  transmit a null-authentication request to a subscriber database in the core network and receive a successful authentication response from the subscriber database responsive to the null-authentication request, the null-authentication request including a null value for a subscriber identifier and including the MCC and MNC, and
  establish, via a packet gateway, an emergency data session between the UE and a mobile profile manager external to the core network through the core network after successfully authenticating with the core network, the emergency data session allowing traffic between the mobile profile manager and the UE through the core network; and
wherein the UE is further configured to download an active mobile profile from the mobile profile manager after the emergency data session is established.

12. The system of claim 11, wherein detecting that the mobile profile is not stored by the UE is triggered after powering on.

13. The system of claim 11, wherein detecting that a mobile profile is not stored by the UE comprises determining, by the UE, that a provisioning profile is not stored in a programmable device of the UE.

14. The system of claim 13, wherein the programmable device comprises a device selected from the group consisting of an embedded-SIM (eSIM), embedded universal integrated circuit card (eUICC), Smart Secure Platform (SSP), and integrated UICC (iUICC).

15. The system of claim 11, wherein detecting that a mobile profile is not stored by the UE comprises: determining that a subscriber identity module (SIM) or universal integrated circuit card (UICC) is not communicatively coupled to the UE.

16. The system of claim 11, wherein detecting that a mobile profile is not stored by the UE comprises: determining that a provisioning profile is not stored in a programmable device of the device.

17. The system of claim 11, wherein transmitting the attachment request to a core network comprises transmitting the attachment request to a small cell access point.

18. The system of claim 11, wherein transmitting the attachment request to a core network comprises: transmitting the attachment request to a private core network.

19. The system of claim 11, wherein establishing the emergency data session comprises: establishing a bearer path with a packet gateway, wherein the packet gateway is configured to allow data traffic to the mobile profile manager.

20. The system of claim 11, the UE is further configured to write the active mobile profile to a programmable device of the UE and disable a null authentication capability after writing the active mobile profile.

\* \* \* \* \*